J. R. SLOAN & G. H. LIEBEGOTT.
ELECTRIC SWITCH.
APPLICATION FILED JULY 18, 1916.
1,274,094.
Patented July 30, 1918.
2 SHEETS—SHEET 1.
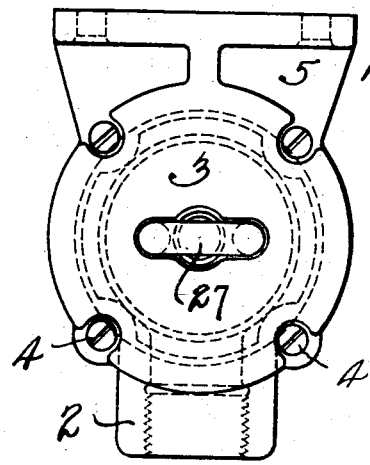
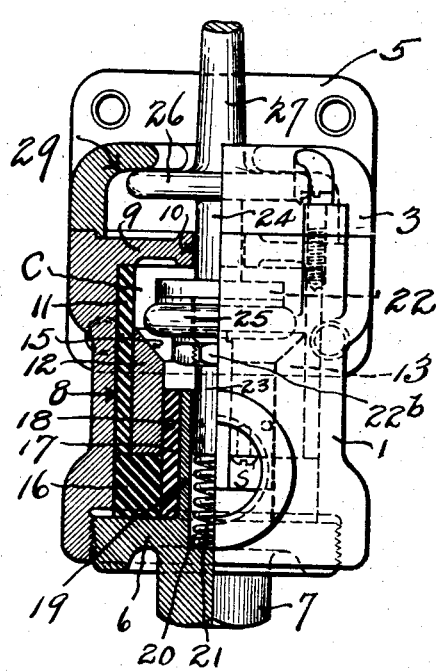
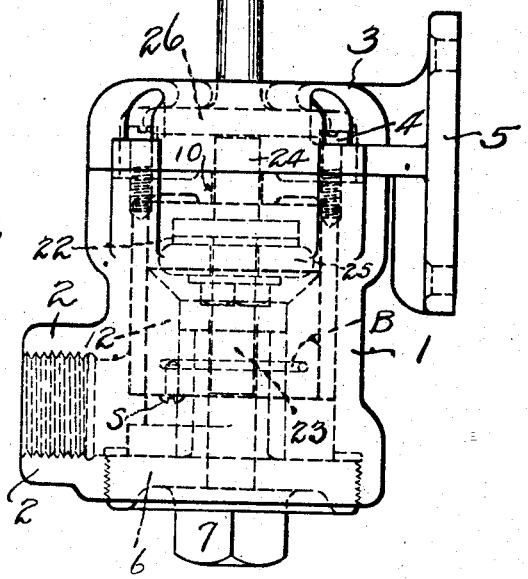
Witness
E. L. Groff.
Inventors
JAMES R. SLOAN
GEORGE H. LIEBEGOTT
By N. E. Gee
Attorney

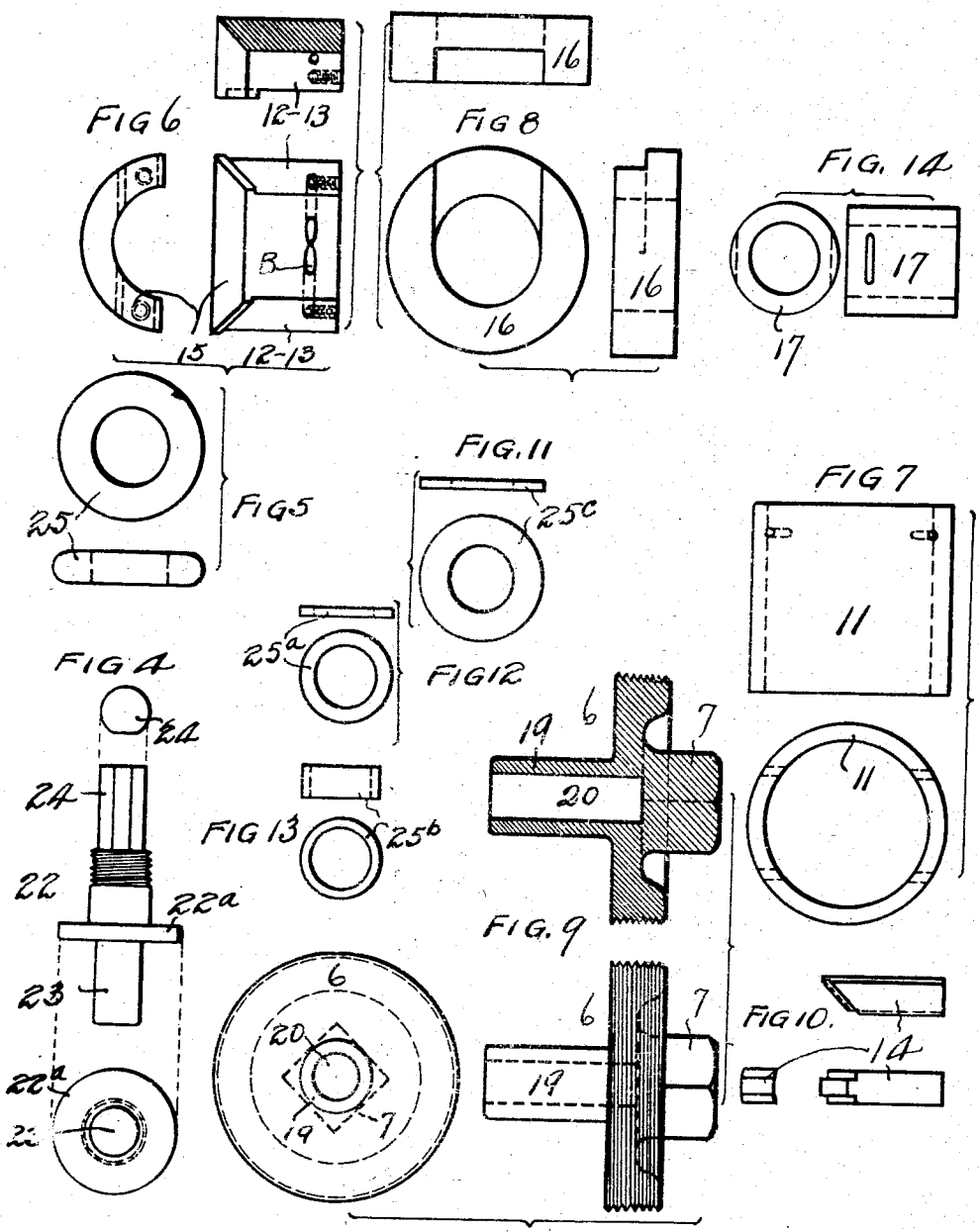

UNITED STATES PATENT OFFICE.

JAMES RICHARD SLOAN AND GEORGE H. LIEBEGOTT, OF ALTOONA, PENNSYLVANIA.

ELECTRIC SWITCH.

1,274,094.     Specification of Letters Patent.     Patented July 30, 1918.

Application filed July 18, 1916. Serial No. 110,001.

*To all whom it may concern:*

Be it known that we, JAMES R. SLOAN and GEORGE H. LIEBEGOTT, citizens of the United States, residing at Altoona, in the county of Blair and State of Pennsylvania, have invented certain new and useful Improvements in Electric Switches, of which the following is a specification.

This invention relates to electric switches, and more particularly to a device of this character that is especially adapted for use in connection with electropneumatic brake signals.

Primarily the invention proposes to provide a novel switching device whereby the train operator may signal desired information to the motorman or engineer. In this connection it may be noted that the invention is of special utility on electrically operated trains, such as are now coming into more general use, and although especially designed for this purpose, its application to steam operated cars may be readily accomplished by the use of suitable storage batteries and pneumatic valves. Accordingly, it will be apparent that the present invention has in view a switch adapted to be used in connection with a signal device, whereby an electric circuit may be closed to a pneumatic valve of the train signal system to admit air into a suitable audible signal device arranged in a convenient position within the driver's compartment.

Another object of this invention is to provide a signaling device that will stand the usual rough usage given such devices by train operators while at the same time provide a mechanism that is free from operating defects, such as burned terminals, short circuits and similar ailments common to devices of this nature.

A still further object of the present invention is to provide a suitable case wherein the switch mechanism is contained, such that the various parts of the device are held in position and alinement, in addition to furnishing means for securing the case to the car body together with provision for attaching suitable electrical conduit pipe in which the wires to the pneumatic valves are placed.

With these and many other objects in view which will more readily appear as the nature of the invention is better understood, the same consists in the novel construction, combination, and arrangement of parts as hereinafter more fully described, illustrated, and claimed.

A preferred and practical embodiment of the invention is illustrated in the accompanying drawings, in which—

Figure 1 shows a front elevation, partly in section of our improved train signal switch.

Fig. 2 shows a side elevation of the parts shown in Fig. 1.

Fig. 3 is a plan view of the switch as shown in Fig. 1.

Fig. 4 is a composite illustration showing bottom plan, elevation, and top plan views of the circuit closing element which carries the contact ring.

Fig. 5 shows a plan and edge view of the contact ring.

Fig. 6 is a composite illustration showing top plan, side elevation and sectional views of one of the wire terminal plates upon which the contact ring impinges.

Fig. 7 shows a cylindrical bushing which insulates the terminal plates shown in Fig. 6 of the drawings from the casing.

Fig. 8 shows top plan and edge views of the bottom insulation ring which is shown in position in Fig. 1 of the drawings.

Fig. 9 shows sectional and elevational views of the combined bottom closure plug and circuit closing element guide.

Fig. 10 shows three views of the insulating blocks which are adapted to be interposed between the two terminal plates shown in Fig. 6 of the drawings.

Fig. 11 shows an edge and side elevation of an insulating washer which is adapted to be interposed between the shoulder of the circuit closer plunger and the contact ring.

Fig. 12 shows a similar washer which is adapted to be positioned between the circuit closing ring and the clamping nut that holds the ring in place.

Fig. 13 shows a plan edge view of a washer that surrounds the shank of the circuit closing device and insulates the contact ring therefrom.

Fig. 14 is a top plan and side view of the sleeve of insulation that insulates the terminal plates from the closure plug.

Similar reference numerals designate corresponding parts throughout the several figures of the drawings.

As previously indicated, the present device is adapted to be used in an electric train signaling system, of the type now employed on electrically operated trains, and wherein a pneumatic valve opens the air valve to sound a whistle placed in the motorman's compartment. Thus, the present invention contemplates a switching device for closing the circuit to the electro-magnets of the air valve, which switch device may be operated by the train-man in a convenient manner to close the magnet circuit, and thus sound the signal.

The present switch device essentially includes a hollow casing member 1 having an offset wire inlet extension 2, and a cap member 3, which is secured to the main part of the casing by means of the screws or equivalent fastenings 4. This cap member may be provided with an attaching bracket 5, whereby the switch may be attached to any convenient part of the car, and in any desired position. With further reference to the cap member 3 and the casing 1, it may be observed at this point that a novel and practical feature thereof is the location of the screws or equivalent fastenings 4 for securing the cap and casing together. That is to say, the said fastening elements are four in number and equidistant from each other, so that the casing may be fitted to the cap in any one of four positions, whereby the wire inlet extension 2 of the casing may be projected in any one of four vertical planes 90 degrees apart. This feature of the invention is of much practical importance, since it provides for the attaching of the bracket in any convenient place on the car body, and the positioning of the wire inlet of the casing in such a direction that it may be easily accessible for leading in the circuit wires.

Although the switch device is shown in the present drawing with its operating arm in an upright position, the same may be inverted, and in fact, the device is used in this position in the majority of cases. The end of the casing 1 opposite the cap 3 is provided with a detachable closure plug 6 having the nut portion 7, so that the same may be readily turned by means of a suitable tool to screw the plug into and out of position.

Referring now more particularly to the details of construction, it will be observed that the said casing 1 is provided with the cylindrical bore 8, the end of which opposite the point at which the plug 6 is fitted to the casing, terminates at the wall 9 which is provided with a guide opening 10, thus forming a substantially closed switch chamber C. Within this chamber C, there is arranged an insulating sleeve 11, which completely covers all of the face of the bore 8, and the line wire terminals 12 and 13 respectively. These line wire terminals are thus completely insulated from the casing by means of the sleeve 11, and are insulated from each other by means of the insulation blocks 14. As will be observed from the drawings, these line wire terminals are arc-shaped pieces of metal, whose upper ends are beveled as at 15 for the purpose hereinafter more fully set forth.

The line wire terminals 12 and 13 above referred to are held in position within the switching chamber by means of the insulation ring 16 which abuts against the inner face of the plug 6 and said terminals have attached thereto the line wires which pass through the insulating sleeve 17, as indicated at 18, to suitable openings B in the terminal plates, where the ends of the line wires may be clamped by means of the set screws S. The insulating sleeve 17, above referred to, receives the plug extension 19, which is provided with a socket 20 for receiving a suitable spring 21.

The spring 21 arranged within the socket 20 is adapted to operatively position a reciprocating circuit-closing element 22 in the switching chamber C. This circuit closing element essentially includes the opposite guide stems 23 and 24, the former slidably engaging in the socket 20 and abutting against the spring 21, while the latter slidably engages the guide opening 10 in the wall 9 of the casing. This circuit-closing device also includes a metallic circuit-closing ring 25 arranged between the stems 23 and 24, and suitably insulated therefrom. That is to say, this ring 25 is insulated from the plunger element which includes the stems 23 and 24 by means of the washer 25$^a$, ferrule 25$^b$, and the relatively large washer 25$^c$. The latter washer is interposed between one edge of the ring 25 and the disk portion 22$^a$, integral with the stems 23 and 24, and constituting an abutment for clamping the ring 25 in position. As will be observed from Fig. 1, the ring 25 is held in position against the face of the disk 22$^a$, by means of a nut 22$^b$, which is in threaded engagement with a portion of the stem 23. Of course, as previously explained, this disk is insulated from the plunger. With the arrangement shown the circuit-closing ring 25 will always be held out of contact with the line wire terminal plates 12 and 13, since the entire circuit-closing device is normally pushed toward the wall 9 by the spring 21 regardless of the position in which the entire switch is supported.

The outer end of the stem 24 of the circuit-closing device projects beyond the outer face of the permanent end wall 9 of the casing, and is adapted to abut with the head 26 of an operating member 27. This operating member is preferably provided at its free end with an eye 28 for connecting with a train-man's rope, and the head 26 is confined between the end spring-pressed stem 24 and the curved abutment wall 29 of the interior of the cap member 3. As will be observed from Fig. 3, the cap 3 is circular, and therefore, the abutment wall 29 is also circular, and as the head 26 is of a similar design and provided with the rounded periphery, it will be apparent that the movement of the operating member 27 in any direction will cause the head 26 to hinge on the abutment wall 20 of the cap at a point opposite the direction of pull on the member 27, to thereby tilt the head and depress the circuit-closing element so that the metallic ring 25 thereof will close the circuit between the wire terminal plates 12 and 13.

Accordingly, it will be apparent that a novel and distinctive feature of the present invention is the provision of a switch device which is capable of being operated by a pull from any direction. That is to say, the present switch device is capable of closing the circuit between the wire terminal plates 12 and 13 by movement of the operating member 27 in any direction to cause the reciprocation of the circuit-closing element 22 and thus bring the metallic ring 25 thereof in circuit-closing position with respect to the wire terminal plates. Thus, the construction shown provides in effect a universal joint or coupling between the operating stem and the circuit-closing element, whereby the circuit may be closed regardless of the direction of pull on the operating member.

Without further description it is thought that the many features and advantages of the invention will be readily apparent and it will be understood that various changes in the form, proportion and minor details of the construction may be resorted to without departing from the spirit, or sacrificing any of the advantages of the invention.

We claim:

1. An electric switch device including a hollow casing open at one end and having a closed wall at the other provided with a guide opening, a cap member having a central opening and adapted to be fitted to the closed end of said casing and coöperating therewith to provide a clearance chamber, line wire contacts arranged within the hollow casing, a plug detachably fitted in the open end of the casing and having a sleeve portion projecting therein, a circuit closer having opposite stem portions one of which is guided in the opening in the closed end wall and the other of which is guided in said sleeve of the plug, a spring for maintaining the circuit closer out of contact of the line wire terminals, and a circuit closer operating member located in the clearance space of the cap.

2. An electric switch device including a casing, separate line wire terminal plates arranged within the casing and insulated therefrom, a circuit closing member consisting of a circular body having opposite guide stem portions one of which projects through and beyond the upper wall of the casing, a spring for holding said circuit closing member normally out of contact with said terminal plates, and an operating unit for the circuit closing member fitted to the top of the casing and forming a housing for the exposed end of the stem and an operating member including a head portion clamped between the exposed end of the circuit closer and the housing and an operating shank portion projecting from said head.

3. An electric switch device including a casing, line wire terminal contact plates arranged within the casing and insulated therefrom, a plug detachably fitted in one end of said casing and having a socket, a permanent end wall formed at the other end of said casing, a cap member fitted to the casing and carrying an attaching bracket, a circuit closing member having opposite stem portions respectively guided in the socket of said plug and said end wall, and an operating member including a stem and a flat base portion confined between the inner side of said cap and one of the stem portions of said circuit closing member.

4. An electric switch device including a casing having a guide opening, arc shaped line wire terminal plates arranged within the casing and insulated therefrom and also insulated from each other, a screw plug detachably fitted within one end of said casing and having a hollow sleeve portion insulated from said line wire terminal plates, a circuit closer having a disk body and opposite axial stem portions, one of which is guided in the hollow sleeve portion of the plug and the other of which slidably engages in the guide opening of the casing, a spring housed in the hollow sleeve of the plug and engaging the stem of the circuit closer disposed therein, a cap member fitted to the casing, and an operating member having a flat head portion interposed between one end of the circuit closing member and the interior base of the cap.

In testimony whereof they have affixed their signatures in presence of two witnesses.

JAMES RICHARD SLOAN.
GEORGE H. LIEBEGOTT.

Witnesses:
N. E. GEE,
J. T. HANLON.